US010792564B1

(12) United States Patent
Seghers et al.

(10) Patent No.: US 10,792,564 B1
(45) Date of Patent: Oct. 6, 2020

(54) COORDINATION OF CONTENT PRESENTATION OPERATIONS

(71) Applicant: Amazon Technologies, Inc., Seattle, WA (US)

(72) Inventors: John Russell Seghers, Woodinville, WA (US); Semih Energin, Seattle, WA (US); Forrest Power Trepte, Redmond, WA (US); James Jefferson Gault, Kirkland, WA (US); Quais Taraki, Bellevue, WA (US); Robin Dale Reigstad, Jr., Issaquah, WA (US); Noah Lake Callaway, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 154 days.

(21) Appl. No.: 15/802,752

(22) Filed: Nov. 3, 2017

Related U.S. Application Data

(63) Continuation of application No. 14/542,178, filed on Nov. 14, 2014, now Pat. No. 9,839,843.

(51) Int. Cl.
| | | |
|---|---|---|
| A63F 13/25 | (2014.01) |
| G06F 16/58 | (2019.01) |
| G06T 15/00 | (2011.01) |
| H04N 1/00 | (2006.01) |
| G06F 16/957 | (2019.01) |
| H04L 29/08 | (2006.01) |
| A63F 13/358 | (2014.01) |

(52) U.S. Cl.
CPC .............. *A63F 13/25* (2014.09); *G06F 16/58* (2019.01); *G06F 16/9577* (2019.01); *G06T 15/00* (2013.01); *H04L 67/04* (2013.01); *H04N 1/00244* (2013.01); *A63F 13/358* (2014.09); *A63F 2300/534* (2013.01)

(58) Field of Classification Search
None
See application file for complete search history.

(56) References Cited

U.S. PATENT DOCUMENTS

| | | |
|---|---|---|
| 8,069,258 B1 | 11/2011 | Howell |
| 8,678,929 B1 | 3/2014 | Nishimura et al. |
| 8,988,528 B2 | 3/2015 | Hikita |
| 9,178,933 B1 | 11/2015 | Soland |

(Continued)

OTHER PUBLICATIONS

U.S. Appl. No. 14/542,241, filed Nov. 14, 2014, Seghers et al.

(Continued)

*Primary Examiner* — Jason T Yen
(74) *Attorney, Agent, or Firm* — BakerHostetler

(57) ABSTRACT

Techniques for coordination of content presentation operations are described herein. In some cases, a client may generate client metadata associated with client event data. The client metadata may include, for example, an indication of any one or more of a time, a frame, a location, an angle, a direction, a speed, a force, or other information associated with the client event data. Also, in some cases, the content provider may generate content provider metadata associated with image data. For example, the content provider metadata may indicate a location of a virtual camera associated with the respective image data and/or a location of one or more objects represented within the respective image data.

15 Claims, 8 Drawing Sheets

(56) References Cited

U.S. PATENT DOCUMENTS

| | | | |
|---|---|---|---|
| 9,413,807 B1* | 8/2016 | Sherman | H04L 67/02 |
| 9,821,222 B1 | 11/2017 | Energin et al. | |
| 9,839,843 B1 | 12/2017 | Seghers et al. | |
| 2002/0161885 A1 | 10/2002 | Childers et al. | |
| 2005/0243083 A1* | 11/2005 | Frazelle | G06T 15/00 |
| | | | 345/419 |
| 2006/0148528 A1 | 7/2006 | Jung et al. | |
| 2006/0184532 A1* | 8/2006 | Hamada | G06F 3/1454 |
| 2010/0022302 A1 | 1/2010 | Iwakiri et al. | |
| 2010/0088297 A1* | 4/2010 | Kiilerich | H04L 67/06 |
| | | | 707/705 |
| 2010/0194891 A1 | 8/2010 | Hikita | |
| 2011/0072081 A1 | 3/2011 | Fang et al. | |
| 2011/0072094 A1 | 3/2011 | Rapo | |
| 2011/0078593 A1* | 3/2011 | Matsui | G06F 3/0238 |
| | | | 715/760 |
| 2012/0047234 A1* | 2/2012 | Terayoko | G06F 16/9577 |
| | | | 709/219 |
| 2012/0163771 A1 | 6/2012 | Li | |
| 2012/0176473 A1* | 7/2012 | Genova | H04N 13/128 |
| | | | 348/46 |
| 2012/0220251 A1 | 8/2012 | Nakayama et al. | |
| 2012/0321192 A1 | 12/2012 | Marshall et al. | |
| 2013/0051755 A1 | 2/2013 | Brown et al. | |
| 2013/0165164 A1 | 6/2013 | Rowe | |
| 2013/0307997 A1 | 11/2013 | O'Keefe et al. | |
| 2013/0344966 A1 | 12/2013 | Mustafa | |
| 2014/0074783 A1 | 3/2014 | Alsina et al. | |
| 2014/0094299 A1 | 4/2014 | Stine et al. | |
| 2014/0122729 A1* | 5/2014 | Hon | H04L 67/04 |
| | | | 709/228 |
| 2014/0125702 A1* | 5/2014 | Santillan | A63F 13/65 |
| | | | 345/633 |
| 2014/0156736 A1 | 6/2014 | Chung et al. | |
| 2014/0274370 A1 | 9/2014 | Shah et al. | |
| 2014/0274379 A1 | 9/2014 | Justice et al. | |
| 2014/0274384 A1 | 9/2014 | Boswell et al. | |
| 2015/0142878 A1 | 5/2015 | Hebert et al. | |
| 2015/0278604 A1 | 10/2015 | Shuster et al. | |
| 2015/0352446 A1 | 12/2015 | Ma et al. | |
| 2015/0379407 A1 | 12/2015 | Woon et al. | |
| 2016/0001177 A1 | 1/2016 | Tsushima et al. | |
| 2016/0037230 A1 | 2/2016 | Van Der Laan et al. | |

OTHER PUBLICATIONS

U.S. Appl. No. 15/789,031, filed Oct. 20, 2017, Energin et al.

Patrizio; "Microsoft Research may have solved the latency issue for cloud gaming"; Microsoft Research; http://www.itworld.com/article/2693934/cloud-computing/microsoft-research—may-have-; Aug. 22, 2014; accessed Dec. 17, 2014; 2 pages.

Lee et al.; "Outatime: Using Speculation to Enable Low-Latency Continuous Interaction for Cloud Gaming"; Microsoft Research; Aug. 2014; 14 pages.

\* cited by examiner

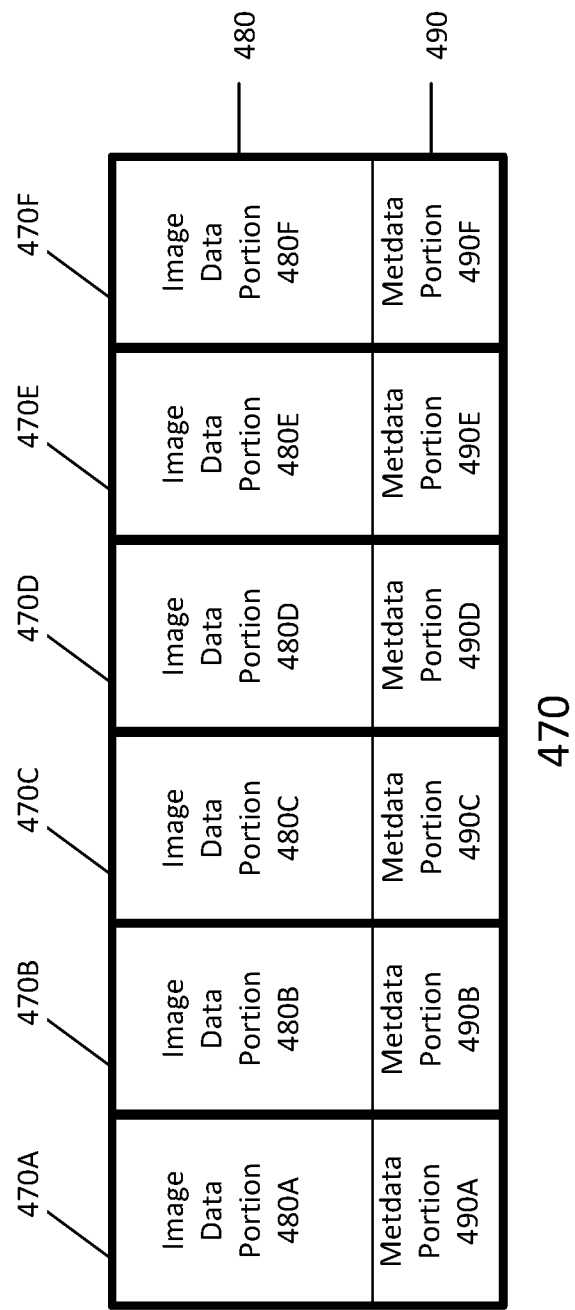

FIG. 5

Table 500

| Elapsed Time (ms) 511 | Client Frame 512 | Direction 513 | Rendering Frame 514 | Sending Frame 515 | Comments 516 |
|---|---|---|---|---|---|
| 0 | 0 | C → | | | |
| 33.3 | 1 | | 3 | 2 | The user releases the ballista. The ballista will fire in frame 2. The client sends an indication of the ballista release by the user and associated metadata. |
| 66.7 | 2 | →CP | 4 | 3 | |
| | | | 5 | 4 | The indication of ballista release by the user and associated metadata arrives at the content provider. The content provider renders the projectile into frame 5 as if it has been fired in frame 2 and had flown for three frames. |
| 100 | 3 | ←CP | 6 | 5 | The content provider sends its first frame including the projectile (frame 5) and sends a confirmation that the content provider has received the indication of the ballista release. |
| 133.3 | 4 | | 7 | 6 | |
| 166.7 | 5 | C ← | 8 | 7 | The client receives the confirmation that the content provider has received the indication of the ballista release. |

FIG. 6

Table 500

| Elapsed Time (ms) 511 | Client Frame 512 | Direction 513 | Rendering Frame 514 | Sending Frame 515 | Comments 516 |
|---|---|---|---|---|---|
| 0 | 0 | | | | |
| 33.3 | 1 | C → | 3 | 2 | The user releases the ballista. The ballista will fire in frame 2. The client sends an indication of the ballista release by the user and associated metadata. |
| 66.7 | 2 | → CP | 4 | 3 | The indication of ballista release by the user and associated metadata arrives at the content provider. The content provider renders the projectile into frame 5 as if it has been fired in frame 2 and had flown for three frames. |
| 100 | 3 | ← CP | 5 | 4 | The content provider sends its first frame including the projectile (frame 5) and sends a confirmation that the content provider has received the indication of the ballista release. |
| 133.3 | 4 | | 6 | 5 | |
| 166.7 | 5 | C ← | 7 | 6 | The client receives the indication that the projectile has been launched in frame 5. |
| | | | 8 | 7 | |

Additional Comments 600: The client renders temporary local versions of the projectile in frames 2-4 until the indication of launch is received from the content provider with frame 5.

COORDINATION OF CONTENT PRESENTATION OPERATIONS

CROSS-REFERENCE TO RELATED APPLICATIONS

This application is a continuation of U.S. patent application Ser. No. 14/542,178, filed on Nov. 14, 2014, the disclosure of which is hereby incorporated by reference as if set forth in its entirety. This application is related to the following applications, each of which is hereby incorporated by reference in its entirety: U.S. patent application Ser. No. 14/541,921 filed Nov. 14, 2014, entitled "COORDINATION OF CONTENT PRESENTATION OPERATIONS"; U.S. patent application Ser. No. 14/542,241 filed Nov. 14, 2014, entitled "COORDINATION OF CONTENT PRESENTATION OPERATIONS".

BACKGROUND

Content items, such as video games, may sometimes be streamed from a remote server to a client for presentation on the client. This model may sometimes be advantageous by, for example, allowing the client to benefit from enhanced computing capabilities, such as graphics processing capabilities, that may be available at the server relative to the client. However, while this model may provide many associated advantages, there are also some associated limitations. For example, there may sometimes be an appreciable delay between a time that a user provides input and the time that the results of the input are actually reflected in the video stream that is received from the server. For example, consider the scenario in which a user fires a weapon that launches a projectile into space. In this scenario, there may be an appreciable delay between the time that the user fires the weapon and the time that an image of the launched projectile is displayed to the user. In some cases, the delay may be long enough that it may seem inappropriate and unnatural and may negatively affect the user's appreciation of the content item.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 4 is a diagram illustrating an example data transmission stream that may be used in accordance with the present disclosure.

FIGS. 5 and 6 are diagrams illustrating some examples of coordination of content presentation operations that may be used in accordance with the present disclosure.

DETAILED DESCRIPTION

Techniques for coordination of content presentation operations are described herein. In some cases, a client may receive client event data associated with a content item. The client event data may, for example, be associated with an occurrence of an event within the content item, such as a firing of a weapon. The client may then generate client metadata associated with the client event data. The client metadata may include, for example, an indication of any one or more of a time, a frame, a location, an angle, a direction, a speed, a force, or other information associated with the client event data. The client may then send, to a content provider, information including an indication of the client event data and the associated client metadata. Upon receiving the information from the client, the content provider may use the information to generate one or more subsequent frames. For example, the content provider may determine a location of one or more objects within a subsequent frame based, at least in part, on the received information from the client. The content provider may then transmit the one or more subsequent frames to the client for display. Also, in some cases, prior to receiving the one or more subsequent frames from the content provider, the client may generate local image data associated with the client event data and may display the local image data until the one or more subsequent frames are received from the content provider.

Also, in some cases, the content provider may generate an image data series comprising a plurality of image data portions each including image data corresponding to at least part of a respective image of a plurality of images. The content provider may also generate a metadata series comprising a plurality of metadata portions each associated with a respective image data portion. Each metadata portion may comprise metadata associated with the image data in the respective image data portion. For example, the metadata portion may indicate a location of a virtual camera associated with the respective image data portion and/or a location of one or more objects represented within the respective image data portion. The content provider may transmit, to the client, at least one data stream including the image data series and the metadata series. Upon receipt, the client may use the metadata series to perform various operations associated with the image data series. For example, the client may use a metadata portion to generate client image data for display in combination with the image data from the content provider in the respective image data portion.

Figure 1:
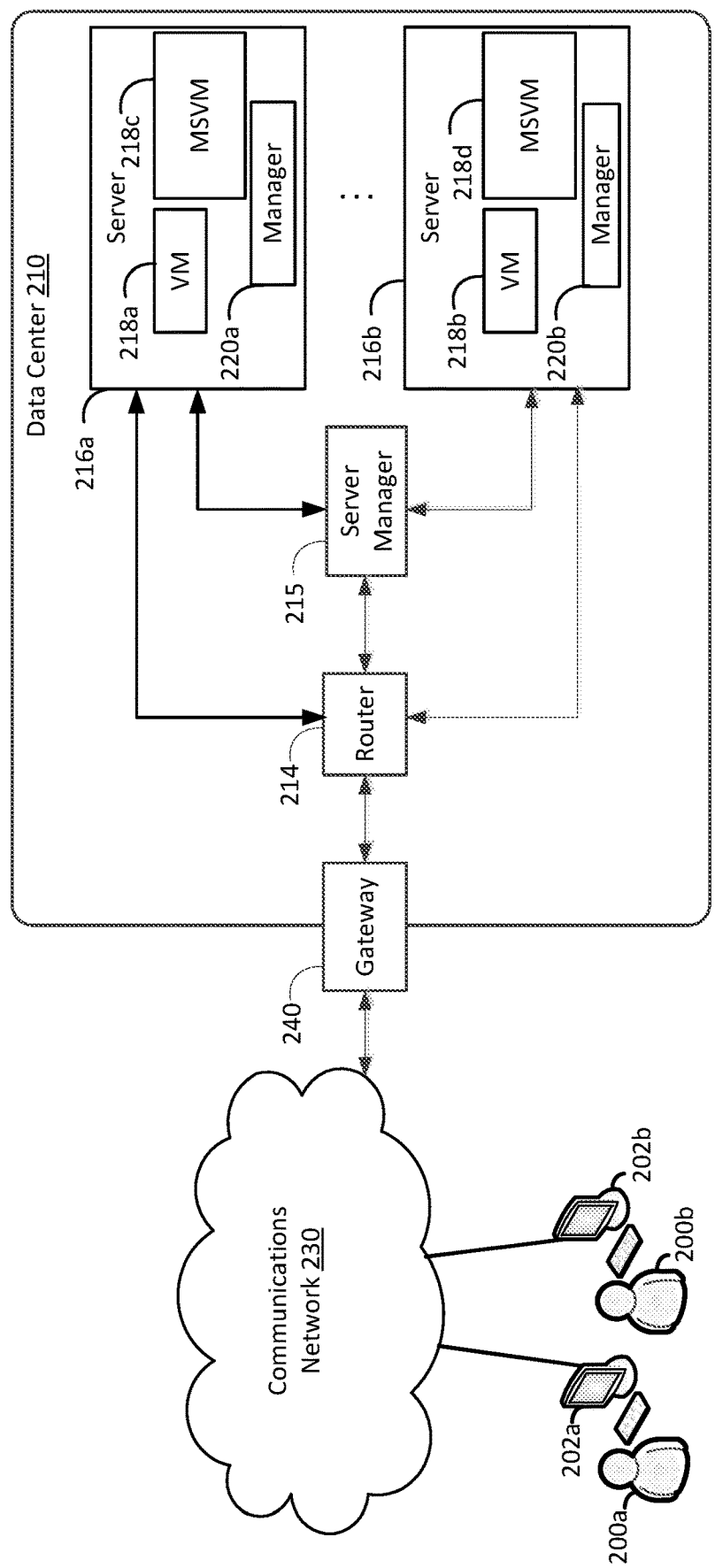
FIG. 1 is a diagram illustrating an example computing system that may be used in accordance with the present disclosure.

A content provider may, in some cases, render and transmit content to clients over an electronic network, such as the Internet. An example computing environment that enables rendering and transmission of content to clients will now be described in detail. In particular, FIG. 1 illustrates an example computing environment in which the embodiments described herein may be implemented. FIG. 1 is a diagram schematically illustrating an example of a data center 210 that can provide computing resources to users 200a and 200b (which may be referred herein singularly as user 200 or in the plural as users 200) via user computers 202a and 202b (which may be referred herein singularly as computer 202 or in the plural as computers 202) via a communications network 230. Data center 210 may be configured to provide computing resources for executing applications on a permanent or as-needed basis. The computing resources provided by data center 210 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 210 may include servers 216a and 216b (which may be referred herein singularly as server 216 or in the plural as servers 216) that provide computing resources. These resources may be available as bare metal resources or as virtual machine instances 218a-d (which may be referred herein singularly as virtual machine instance 218 or in the plural as virtual machine instances 218). Virtual machine instances 218c and 218d are content coordination virtual machine ("CCVM") instances. The CCVM virtual machine instances 218c and 218d may be configured to perform all or any portion of the techniques for coordination of content presentation operations and/or any other of the disclosed techniques in accordance with the present disclosure and described in detail below. As should be appreciated, while the particular example illustrated in FIG. 1 includes one CCVM virtual machine in each server, this is merely an example. A server may include more than one CCVM virtual machine or may not include any CCVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 1, communications network 230 may, for example, be a publicly accessible network of linked networks and possibly operated by various distinct parties, such as the Internet. In other embodiments, communications network 230 may be a private network, such as a corporate or university network that is wholly or partially inaccessible to non-privileged users. In still other embodiments, communications network 230 may include one or more private networks with access to and/or from the Internet.

Communication network 230 may provide access to computers 202. User computers 202 may be computers utilized by users 200 or other customers of data center 210. For instance, user computer 202a or 202b may be a server, a desktop or laptop personal computer, a tablet computer, a wireless telephone, a personal digital assistant (PDA), an e-book reader, a game console, a set-top box or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

User computers 202 may also be utilized to configure aspects of the computing resources provided by data center 210. In this regard, data center 210 might provide a gateway or web interface through which aspects of its operation may be configured through the use of a web browser application program executing on user computer 202. Alternately, a stand-alone application program executing on user computer 202 might access an application programming interface (API) exposed by data center 210 for performing the configuration operations. Other mechanisms for configuring the operation of various web services available at data center 210 might also be utilized.

Servers 216 shown in FIG. 1 may be standard servers configured appropriately for providing the computing resources described above and may provide computing resources for executing one or more web services and/or applications. In one embodiment, the computing resources may be virtual machine instances 218. In the example of virtual machine instances, each of the servers 216 may be configured to execute an instance manager 220a or 220b (which may be referred herein singularly as instance manager 220 or in the plural as instance managers 220) capable of executing the virtual machine instances 218. The instance managers 220 may be a virtual machine monitor (VMM) or another type of program configured to enable the execution of virtual machine instances 218 on server 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 1, a router 214 may be utilized to interconnect the servers 216*a* and 216*b*. Router 214 may also be connected to gateway 240, which is connected to communications network 230. Router 214 may be connected to one or more load balancers, and alone or in combination may manage communications within networks in data center 210, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 210 shown in FIG. 1, a server manager 215 is also employed to at least in part direct various communications to, from and/or between servers 216*a* and 216*b*. While FIG. 1 depicts router 214 positioned between gateway 240 and server manager 215, this is merely an exemplary configuration. In some cases, for example, server manager 215 may be positioned between gateway 240 and router 214. Server manager 215 may, in some cases, examine portions of incoming communications from user computers 202 to determine one or more appropriate servers 216 to receive and/or process the incoming communications. Server manager 215 may determine appropriate servers to receive and/or process the incoming communications based on factors such as an identity, location or other attributes associated with user computers 202, a nature of a task with which the communications are associated, a priority of a task with which the communications are associated, a duration of a task with which the communications are associated, a size and/or estimated resource usage of a task with which the communications are associated and many other factors. Server manager 215 may, for example, collect or otherwise have access to state information and other information associated with various tasks in order to, for example, assist in managing communications and other operations associated with such tasks.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 210 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 2:
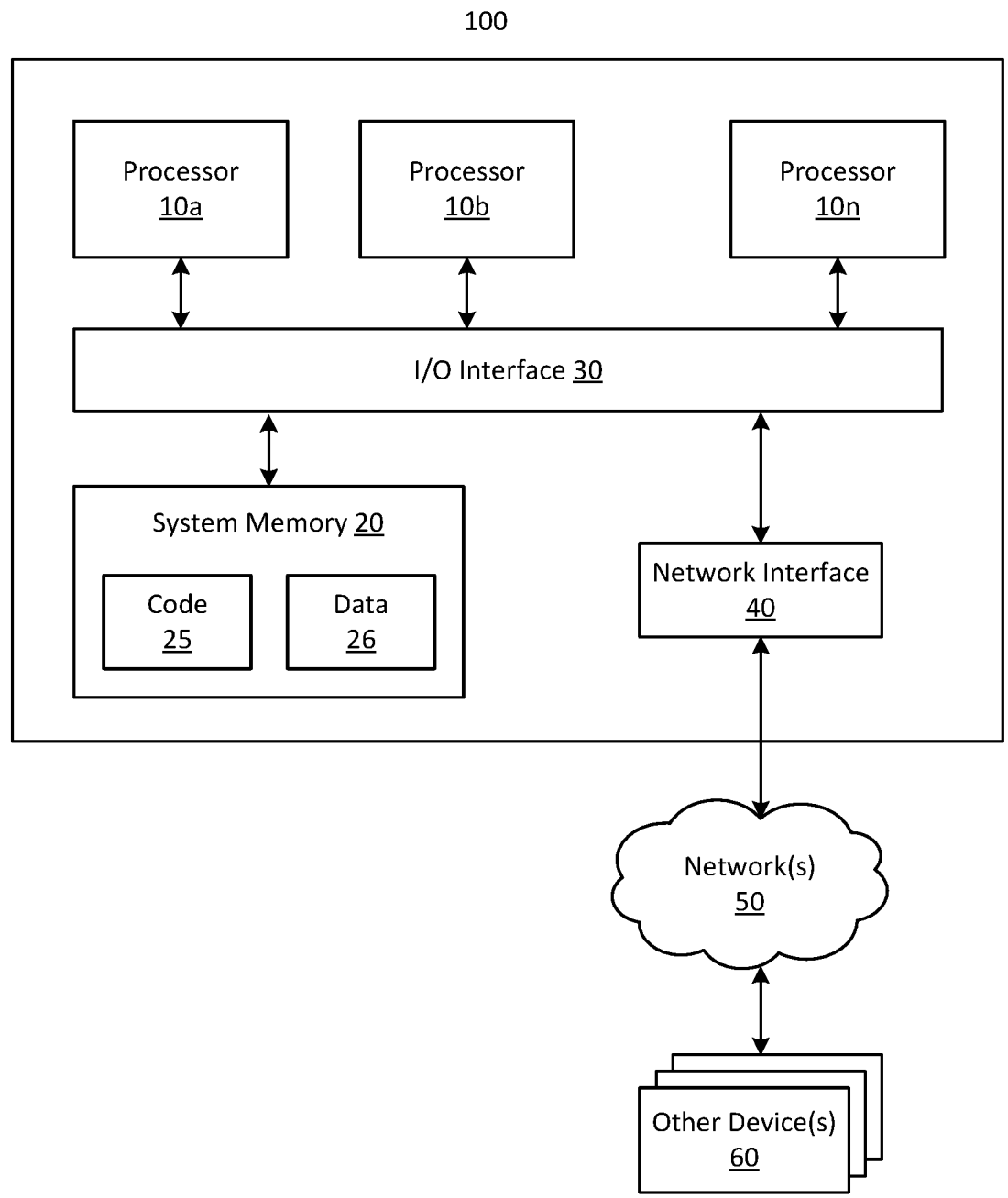
FIG. 2 is a diagram illustrating an example computing system that may be used in accordance with the present disclosure.

In at least some embodiments, a server that implements a portion or all of one or more of the technologies described herein may include a general-purpose computer system that includes or is configured to access one or more computer-accessible media. FIG. 2 depicts a general-purpose computer system that includes or is configured to access one or more computer-accessible media. In the illustrated embodiment, computing device 100 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 100 further includes a network interface 40 coupled to I/O interface 30.

In various embodiments, computing device 100 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be general-purpose or embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 100 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 100 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 100 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40. Portions or all of multiple computing devices, such as those illustrated in FIG. 2, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

Figure 3:
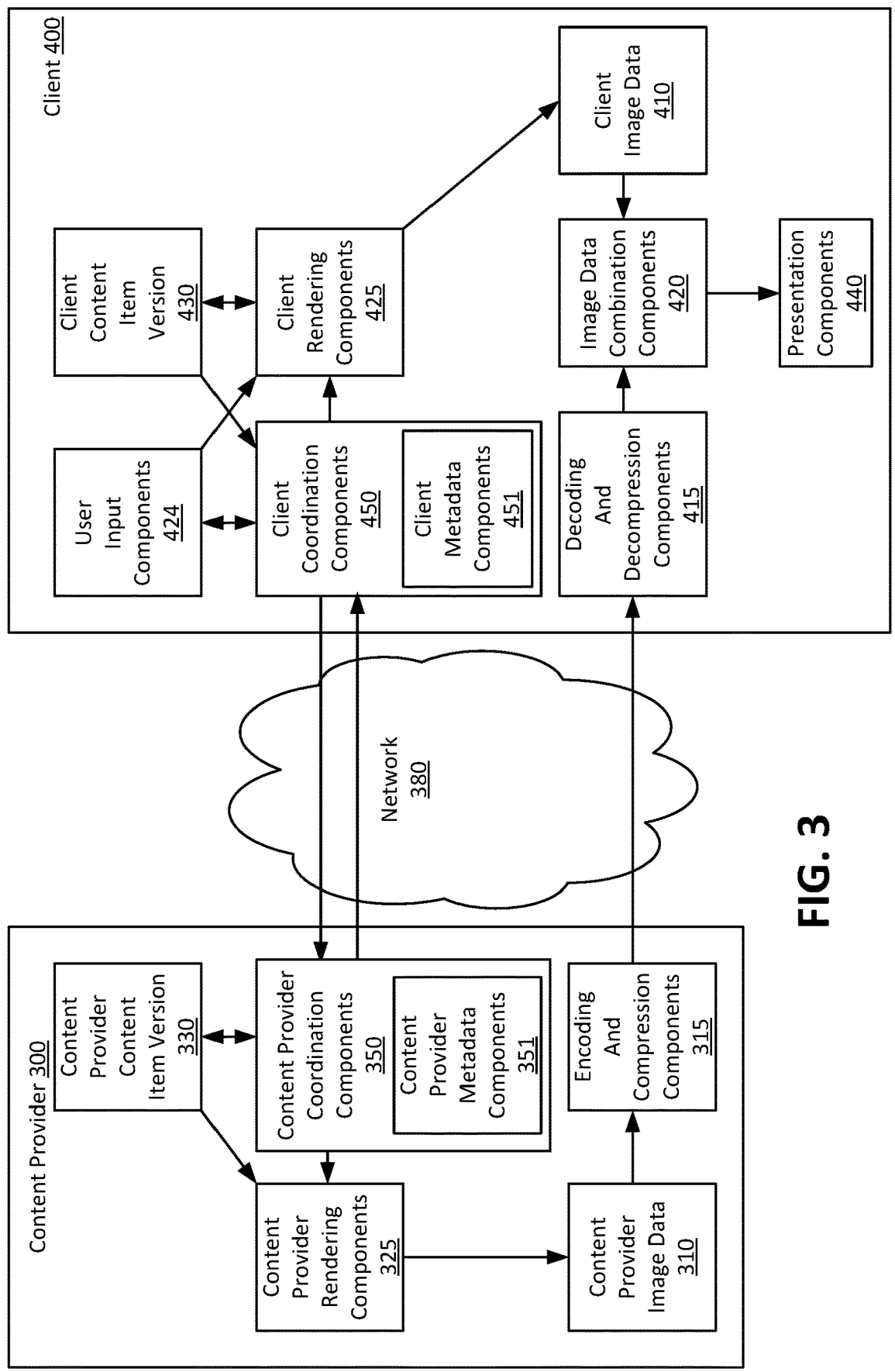
FIG. 3 is a diagram illustrating an example system for coordination of content presentation operations that may be used in accordance with the present disclosure.

FIG. 3 is a diagram illustrating an example system for coordination of content presentation operations that may be used in accordance with the present disclosure. As shown in FIG. 3, content provider 300 and client 400 communicate via network 380, which may, in some cases, be an electronic network such as, for example, the Internet or another type of wide area network (WAN) or local area network (LAN). In some cases, multiple networks may be employed for communications between content provider 300 and client 400. As should be appreciated, content provider 300 may, for example, include one or more server compute nodes, such as in some example configurations described above. As shown in FIG. 3, client 400 and content provider 300 each execute a respective version of a content item. In particular, client 400 executes client content item version 430, while content provider 300 executes content provider content item version 330.

As will be described in greater detail below, client content item version 430 and content provider content item version 330 may, in some cases, be designed to execute in combination with one another such that they may generate complimentary features for one or more images presented at client 400. In some cases, content provider content item version 330 may include code or other instructions for generating content provider-generated features, while client content item version 430 may include code or other instructions for generating client-generated features. As an example, in some cases, image data associated with a content item may be primarily rendered by the content provider 300. As set forth above, in some cases, content provider 300 may have access to more sophisticated processing components in comparison to those available to the client 400. For example, in some cases, content provider 400 may have access to multiple graphics processing units (GPU's) with higher capabilities than that which may be available to client 400. Thus, rendering image data primarily at content provider 400 may, for example, allow the client 400 to benefit from the use of sophisticated technology available to the content provider 300.

However, even when image data is rendered primarily by content provider 300, the client 400 may, in some cases, be responsible for rendering certain image data features. For example, in some cases, the client 400 may be responsible for rendering various features that are highly correlated to user input, such as features associated with aiming and firing of a weapon. In some cases, rendering these features at the client may, for example, allow the features to appear to be more responsive to user input that may be received at the client 400. Additionally, in some cases, the client 400 may be capable of generating temporary and/or lower quality representations of various objects in a scene. The use of such temporary and/or lower quality representations is set forth in detail below. Furthermore, in some cases, the client 400 may be responsible for generating various heads-up-display (HUD), text, or other overlay information. Rendering of such features at the client may, for example, allow the features to be rendered at a higher resolution without passing through video compression. Thus, in some examples, content provider content item version 330 may include code or other instructions for primary rendering of image data, while client content item version 430 may include code or other instructions for rendering various client-generated features, such as those described above.

In some cases, for example, a content creator, such as a company that creates video games, may market and separately distribute separate client and content provider versions of a content item to content providers and to individual clients. In other cases, for example, a content creator may distribute both client and content provider versions to a content provider, and individual clients may then obtain the client version from the content provider or from any number of other additional parties. The client and content provider versions may be distributed using for example, an electronic download, by distributing various forms of storage media and the like. As should be appreciated, it is not required that client 400 and content provider 300 necessarily execute different versions of a content item. For example, in some cases, client 400 and content provider 300 may execute an identical version of a content item but may access or execute different portions or features of the identical content item version.

Client 400 includes client coordination components 450, while content provider 300 includes content provider coordination components 350. In general, client coordination components 450 and content provider coordination components 350 may, for example, collect, maintain, store and exchange coordination information associated with presentation of a content item, such as user input and state information. Such coordination information may include, for example, information associated with various features, events, actions or operations associated with the presentation of a content item. In some cases, rendering of image data or portions of image data at content provider 300 and the use of coordination components 350 and 450 may allow content to be presented at the client using significantly smaller client packages than may be required by other techniques, such as techniques when all rendering is performed on the client.

In some cases, client coordination components 450 may collect user input provided by a user of client 400. The user input may, for example, be in the form of manipulation of a control or device or may also include gesture-based input and audio input. The user input may be provided via user input components 424, which may include, for example, a keyboard, mouse, controller, camera, microphone, and other components or devices. For example, in some cases, client 400 may have control over certain entities associated with the presented content item. Such entities may include, for example, various characters, vehicles, weapons, athletic equipment and the like. For example, video games often allow different participants to control one or more different characters or other entities. Thus, in some cases, client coordination components 450 may collect user input and state information associated with a character or other entity controlled by client 400. For example, a controlled character may be moved to a new location or perform an action such as firing a weapon or swinging a golf club. User input and state information associated with these example actions may, for example, be collected by client coordination components 450. Additionally, client coordination components 450 may collect, for example, information associated with a user selection of a particular entity for control by the user or a user selection to switch control from one entity to another.

As also shown in FIG. 3, content provider 300 includes content provider metadata components 351, while client 400 includes client metadata components 451. Although metadata components 351 and 451 are shown in FIG. 3 as being included within coordination components 350 and 450, it is noted that components 351 and 451, or any portions thereof, may be separate from components 350 and 450. Metadata components 351 and 451 may perform operations such as collecting, maintaining and exchanging metadata associated with a content item. Metadata components 351 and 451 and their uses are described in detail below. The term metadata, as used herein, refers to data that describes or is otherwise associated with other data.

Client 400 may use client coordination components 450 in combination with client content item version 430 to provide input to client rendering components 425 for generation of client image data 410. Similarly, content provider 300 may use content provider coordination components 350 in combination with content provider content item version 330 to content provider rendering components 325 for generation of content image data 310. Client rendering components 425 and content provider rendering components 325 may include, for example, one or more graphics processing units and the like. Client image data 410 and content provider image data 310 may each include, for example, corresponding images, portions of images, or other information that is usable in association with a resulting display image.

Encoding and compression components 315 may encode and compress content provider image data 310 prior to its transmission to client 400. Encoding and compression components 315 may, for example, include an encoder, a compressor, a codec and the like. Encoding and compression components 315 may generally use any appropriate technique to encode and/or compress content image data 310 for transmission to client 400. In some cases, it may not be necessary to encode and/or compress the content provider image data 310. After any encoding and/or compressing operations are performed, content provider image data 310 may be transmitted over network 380 to client 400.

In some cases, content provider image data 310 may be transmitted in accordance with streaming content delivery techniques, in which content may be constantly received and presented by client device 400. Also, in some cases, content provider image data 310 may be transmitted by a dedicated respective server associated with client 400. The use of a separate respective streaming server may be advantageous, for example, because it may, in some cases, enable improved ability to adjust various transmission characteristics to individual clients based on factors such as quality of service associated with a network connection to each client. The adjusted transmission characteristics may include, for example, an applied proportion of forward error correction (FEC), encoding rates, transmission speed, image quality and other relevant factors. It is noted, however, that the disclosed techniques are not limited to the use of separate servers for transmission to each client. Rather, the disclosed techniques may employ any number of servers each for transmission to any number of different clients. It is also noted that the disclosed techniques are not limited to use with streaming technology and that other content delivery techniques may be employed.

Upon being received by client 400, content provider image data 310 may be decoded and/or decompressed by decoding and decompression components 415. Decoding and decompression components 415 may, for example, include a decoder, a de-compressor, a codec and the like. Decoding and decompression components 315 may generally use any appropriate technique to decode and/or decompress content provider stream 310. As set forth above, in some cases, content provider image data 310 may not be encoded and/or compressed, and, therefore, decoding and/or decompression may be unnecessary.

After any decoding or decompressing, content provider image data 310 may be provided, in combination with client image data 410, to image data combination components 420. Image data combination components component 420 may, for example, combine various features of content provider image data 310 and client image data 410 to form resulting display images. The resulting display images may be presented by presentation components 440, which may include, for example, a display screen, a monitor, audio components such as speakers, and the like.

As set forth above, in some cases, a content provider and/or a client may generate, maintain, and exchange metadata associated with a content item. As set forth above, the content provider and/or client may include one or more metadata components, such as content provider metadata components 351 and client metadata components 451 of FIG. 3. In some cases, a content provider may generate metadata associated with one or more image frames and transmit the generated metadata along with the image frames to the client. This metadata may include, for example, location information associated with a corresponding frame. For example, the metadata may indicate a location, angle, field of view, and/or zoom of a virtual camera associated with a frame, locations of various objects and geometries within a frame, and depth mask or other depth data for a frame. As another example, the metadata may include other information that describes or is otherwise associated with image data in a frame. For example, the metadata may include an indication of an orientation, size, scale, rotation, angle, state and/or speed of various objects and geometries within a frame. In some cases, metadata may indicate whether an animation is playing within a frame and/or object, a state of progress of playing of the animation, and/or whether one or more objects are in motion. Also, in some cases, metadata may include a reference to other data or information that may be accessible to the client and may be used by the client in association with a frame. For example, metadata may indicate a location of stored graphics data, video and/or audio that may be rendered or otherwise presented by the client. In some cases, the metadata may refer to other data coming from other sources, such as an additional stream or a less-space-restricted channel. As another example, the metadata may include a confirmation that the content provider has received certain information from the client. For example, if a user at a client fires a weapon that launches a projectile, then the content provider may provide, along with a subsequent frame, a confirmation that the content provider has been notified of the projectile launch and/or is rendering the launched projectile in the subsequent frame.

In some cases, metadata provided by the content provider to the client may assist the client in rendering certain client-generated interface features or other image data. For example, in some cases, a content item may be rendered primarily by the content provider, while certain interface features or other image data may be rendered by the client. As a specific example, in the case of a shooting game, images may be primarily rendered by the content provider, while certain features, such as an interface for aiming and firing a weapon, may be rendered by the client. In some cases, metadata provided by the content provider may assist the client in determining where to render a depiction of an aiming target towards which the weapon will fire. For example, suppose the user is trying to fire a weapon at an enemy combatant. In some cases, the content provider may generate metadata indicating a location, such as coordinate values, of the enemy combatant within a transmitted frame. The client may then use this information in order to determine a location at which to render the aiming target within the corresponding frame.

As another example, in some cases, the client may render certain objects within an image, such as a castle, a building, a vehicle, a character, and others. In some cases, the client may use location information and/or other metadata associated with a virtual camera capturing the frame and/or various other objects within the frame in order to determine locations within the frame at which to render and insert the client-rendered objects.

Furthermore, in some cases, client-rendered objects may be rendered such that they generally appear to be in front of (i.e., positioned at a shallower depth than) content provider-rendered objects within an image. However, in some cases, it may be desirable for a particular client-rendered object to be rendered such that it appears to be behind (i.e., positioned at a deeper depth than) a particular content provider-rendered object. In such cases, it may be possible to make the particular client-rendered object appear to be behind the particular content provider-rendered object by culling the rendering of the client-rendered object at portions of the image that correspond to the particular content provider-rendered object. Thus, the content provider may sometimes generate metadata identifying the location of the particular content provider-rendered object within a frame, and the client may use this information to cull the rendering of the particular client-rendered object at the identified locations of the particular content provider-rendered object.

In some cases, the content provider may transmit image data to the client using an image data series that includes a number of image data portions, such as frames. Each such image data portion may include image data corresponding to at least part of a respective image of a plurality of images. The content provider may also generate a metadata series that includes a number of metadata portions. In some cases, each metadata portion may be associated with a respective image data portion and may include metadata associated with the image data in the respective image data portion. The content provider may transmit, to the client, at least one data stream including the image data series and the metadata series. In some examples, the content provider may encode and compress the image data in the image data series, while content provider may transmit the metadata in the metadata series without encoding and compression.

FIG. 4 is a diagram illustrating an example data transmission stream 470 that may be transmitted by a content provider to a client. As shown in FIG. 4, data transmission stream 470 includes an image data series 480, which includes image data portions 480A-F, and a metadata series 490, which includes metadata portions 490A-F. Data transmission stream 470 includes data stream portions 470A-F, which each include a respective image data portion 480A-F and a respective metadata portion 490A-F. In some cases, each metadata portion 490A-F may be embedded within its respective metadata portion 480A-F.

As should be appreciated, data stream 470 of FIG. 4 is merely one example configuration for transmission of image data and associated metadata from a content provider to a client and other configurations may be employed. For example, in some cases, image data and associated metadata may be transmitted using multiple different transmission streams. In some cases, image data portions and respective metadata portions may include identifiers that may be used by the client to match image data and associated metadata. However, the example configuration of FIG. 4 may be advantageous because, for example, by combining metadata and respective image data into a single stream portion, the metadata and respective image data may, in some cases, be easily identified and matched by the client.

Thus, as set forth above, a content provider may sometimes generate metadata associated with respective image data and transmit the metadata and image data to a client. Furthermore, in some cases, a client may also generate and send metadata to a content provider. This client-generated metadata may, for example, be associated with client event data associated with the content item. The client event data may include, for example, data associated with user input, state changes, or other events associated with the content item that are generated on client side, including with or without collaboration from the content provider. The client metadata may include, for example, an indication of at least one of a time, a frame, a location, an angle, a direction, a force, a speed, or other information associated with the client event data. In some cases, the time associated with the client event data may be indicated in the client metadata as a frame number associated with the client event data, such as a number of a frame being received or displayed by the client and/or a number of a frame being rendered or transmitted by the content provider. Also, in some cases the frame number associated with the client event data may be indicated in the client metadata separately from the time. The content provider may use this client-generated metadata to, for example, determine object locations or other information associated with the rendering of one or more frames. As an example, a user may provide input that causes a weapon, such as a ballista, to fire and release a projectile into space. The client may generate associated metadata, including, for example, an indication of any one or more of a time and/or frame at which the ballista is released, a time and/or frame at which the ballista will fire, a location (e.g., coordinates) of the release, an angle of the release, a force of the release, a direction of the release, a speed of the release, and others. The content provider may use this client-generated metadata to, for example, determine locations of the projectile in subsequently rendered frames.

Some examples of the use of metadata generated by the client and by the content provider, as well as other examples of coordination of content presentation operations will now be described in detail. In particular, referring now to FIG. 5, table 500 illustrates some examples of how the firing of an example weapon, a ballista, may be coordinated between a content provider and a client. In the example, the ballista may have an animation preceding the release of the projectile, such that the projectile will leave the weapon two frames after the user directs the ballista to fire. Specifically, table 500 includes an elapsed time column 511, which indicates example relative elapsed times, in microseconds (ms), associated with values in the other table columns 512-516. Client frame column 512 indicates a number of a frame that the client displays at the respective elapsed time shown in elapsed time column 511. Rendering frame column 514 indicates a number of a frame that the content provider renders at the respective elapsed time shown in elapsed time column 511. Sending frame column 515 indicates a number of a frame that the content provider sends to the client at the respective elapsed time shown in elapsed time column 511. In the particular example of FIG. 5, there is a transit latency of something between 33 ms and 66 ms (e.g., approximately 50 ms) for communications from the client to the content provider and from the content provider to the client.

Table 500 also includes a direction column 513, which indicates a time at which various selected communications are sent or received by the client or the content provider. In particular, in column 513, the notation C → represents a communication being sent by the client, the notation → CP represents a communication being received by the content provider, the notation ← CP represents a communication being sent by the content provider, and the notation C ← represents a communication being received by the client. Additionally, comments column 516 includes comments associated with various selected elapsed times.

As shown in table 500, at elapsed time 0, the client displays frame 0, while the content provider renders frame 3 and sends frame 2 to the client. Additionally, as noted in comments column 516, at elapsed time 0, the user releases the ballista. After being released, the ballista will actually fire at frame 2. Furthermore, at elapsed time 0, the client sends a communication to the content provider, as indicated by the notation C → in direction column 513. In particular, the communication sent by the client may include, for example, an indication of the release of the ballista by the user and associated metadata, such as an indication of any one or more of the following: a time and/or frame at which the ballista is released, a time and/or frame at which the ballista will fire, of a location (e.g., coordinates) of the release, an angle of the release, a force of the release, a direction of the release, a speed of the release, and others. It is noted that the indications of time, such as a time at which the ballista is released and/or a time at which the ballista will fire, may be expressed using values, such as any one or more of a coordinated universal time (UTC), a non-UTC time, a frame number, a sequence number, or any other appropriate time indications. The communication sent by the client at elapsed time 0 may, for example, be generated, in whole or in part, by client metadata components 451 and may, in whole or in part, constitute at least a portion of client-to-content provider metadata that is sent by the client to the content provider at elapsed time 0.

At elapsed time 33.3 ms, the client displays frame 1, while the content provider renders frame 4 and sends frame 3 to the client.

At elapsed time 66.7 ms, the client displays frame 2, while the content provider renders frame 5 and sends frame 4 to the client. Additionally, at elapsed time 66.7 ms, the content provider has received the communication that was sent by the client at elapsed time 0, as indicated by the notation → CP in direction column 513. Furthermore, comments column 516 indicates that the indication of the ballista release by the user and associated metadata is received by the content provider. As also indicated in comments column 516, the content provider renders the projectile into frame 5 as if it has been fired in frame 2 and had flown for three frames.

It is noted here that there may be several advantages associated with the communication sent by the client at elapsed time 0 and received by the content provider by elapsed time 66.7 ms. For example, the communication may provide the content provider with information that the content provider may use to render the projectile and other associated features within frame 5. In particular, based, at least in part, on information such as the time, location, angle, and force of the ballista release, the content provider may determine the location of the ballista within rendered fame 5. Without access to this information, the content provider may be unable to determine an appropriate location for the ballista within rendered frame 5. Thus, in some cases, the disclosed techniques may provide advantages by, for example, allowing the content provider to accurately determine a location and depict, within a frame, moving objects whose movement has been initiated in association with previously rendered frames.

At elapsed time 100 ms, the client displays frame 3, while the content provider renders frame 6 and sends frame 5 to the client. As noted in comments column 516, at elapsed time 100 ms, the content provider sends its first frame including the launched projectile, which is frame 5. Furthermore, at elapsed time 100 ms, the content provider sends a communication to the client, as indicated by the notation ← CP in direction column 513. As also noted in comments column 516, the communication includes a confirmation that the content provider has received the indication of the ballista release from the client. This confirmation may include, for example, an indication that the projectile has been launched in frame 5. The communication sent by the content provider may, for example, be generated, in whole or in part, by content provider metadata components 351 and may, in whole or in part, constitute at least a portion of content provider-to-client metadata that is sent by the content provider to the client at elapsed time 100 ms.

At elapsed time 133.3 ms, the client displays frame 4, while the content provider renders frame 7 and sends frame 6 to the client. Subsequently, at elapsed time 166.7 ms, the client displays frame 5, while the content provider renders frame 8 and sends frame 7 to the client. Additionally, at elapsed time 166.7 ms, the client has received the communication that was sent by the content provider at elapsed time 100 ms, as indicated by the notation C ← in direction column 513. Furthermore, comments column 516 indicates that the client has received the confirmation that the content provider has received the indication of the ballista release from the client.

Thus, in the example of FIG. 5, the content provider uses information provided by the client to render the projectile in frame 5 as if it had been fired in frame 2 and flown for three frames. In some cases, however, it may also be advantageous to render the projectile for display in frames 2-4. Referring now to FIG. 6, it is seen that table 500 of FIG. 5 is also included in FIG. 6 with the identical contents from FIG. 5. However, in addition to table 500, FIG. 6 also includes an additional comments box 600, which indicates that, in the example of FIG. 6, the client renders temporary local versions of the projectile in frames 2-4 until the indication of launch is received from the content provider with frame 5. In some cases, the client's receiving of the content provider's confirmation of receiving the indication of the ballista launch may serve as a trigger to the client to discontinue rendering of the temporary version of the projectile because, at that point, the projectile is now being rendered by the content provider. As should be appreciated, rendering temporary local versions of the projectile by the client may be advantageous because it may, in some cases, reduce the delay associated with depiction of the motion of the projectile and also, in some cases, allow the motion of the projectile to appear to be more natural and complete. In particular, in some cases, if the motion of the projectile is first depicted in frame 5, then the motion may appear partially unnatural because the earlier stages of the projectile's motion path are not depicted in frames 2-4. By contrast, if temporary versions of the projectile are rendered by the client in frames 2-4, then the projectile's path may, in some cases, appear to be depicted more completely and with reduced delay. In particular, the earlier stages of the projectile's motion may be depicted in frames 2-4 using image data generated by the client, while later stages of the projectile's motion may be depicted in frame 5 and following frames using image data generated by the content provider.

In cases when the client renders a temporary version of the projectile in frames 2-4, a number of different techniques may be employed to render the projectile and insert the projectile into the corresponding frames. For example, in some cases, client content item version 430 of FIG. 5 may include code or other instructions that describe the geometry, textures and other visual characteristics of the projectile. In some cases, the versions of the projectile rendered by the client may be lower quality versions with lower complexity relative to the versions of the projectile that are rendered by the content provider. Also, in some cases, the content provider may provide metadata associated with frames 2-4 that may assist the client in determining a location for the projectile within frames 2-4. For example, the content provider may provide metadata that indicates a location, angle, field of view, and/or zoom of a virtual camera associated with frames 2-4, locations of various objects and geometries within frames 2-4, and depth mask or other depth data for frames 2-4. The client may then, for example, use this metadata information to determine an appropriate location, depth, size and other characteristics of the projectile in frames 2-4.

It is noted that there is no requirement that the client must provide temporary versions of the projectile in any, or all, of frames 2-4. For example, in some cases, a determination may be made that the delay time between frames 2 and 5 is insubstantial and that the rendering of the projectile by the client is not desired.

Figure 7A:
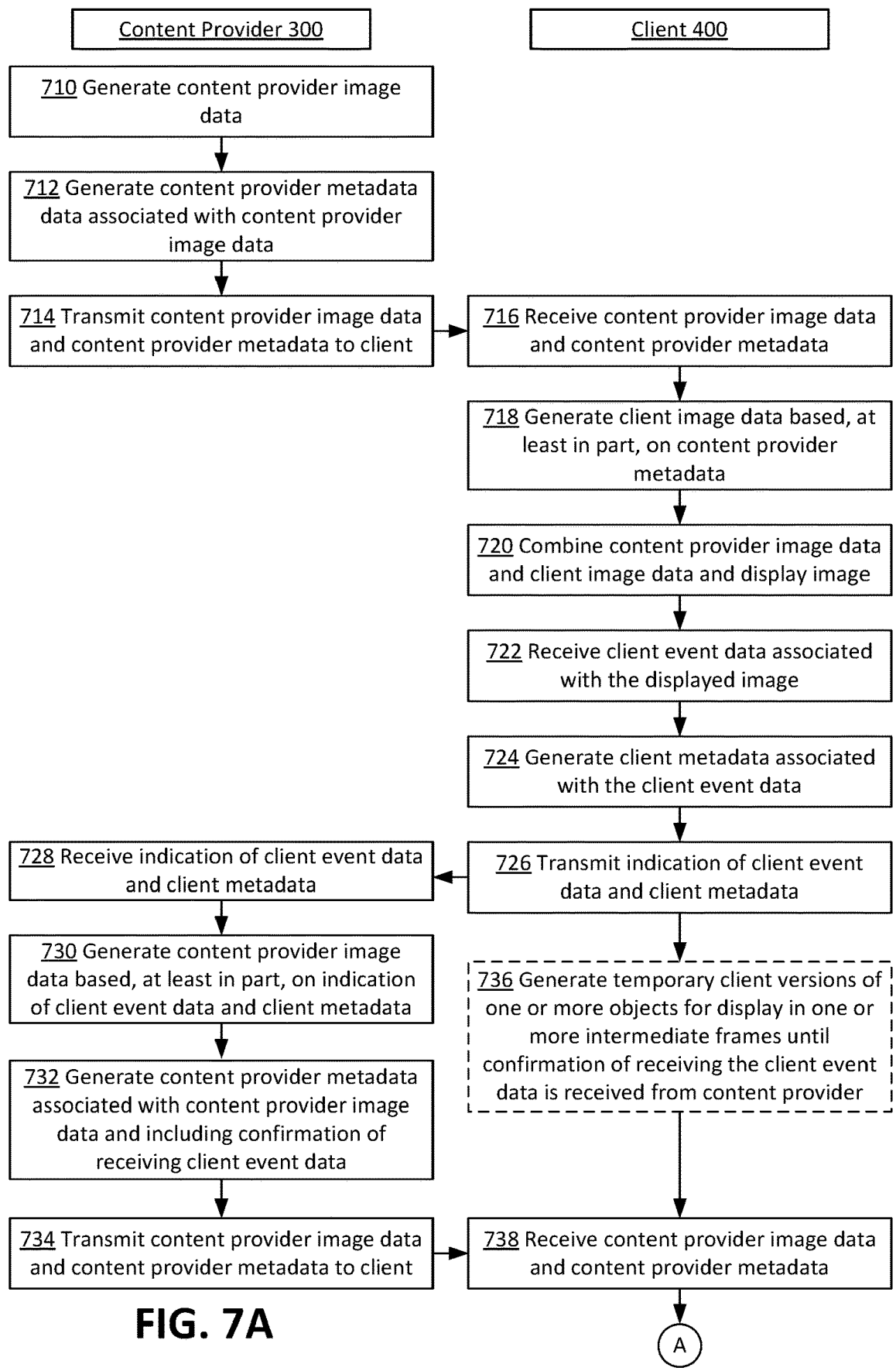
FIGS. 7A and 7B are flowcharts depicting an example process for coordination of content presentation operations that may be used in accordance with the present disclosure.
Figure 7B:
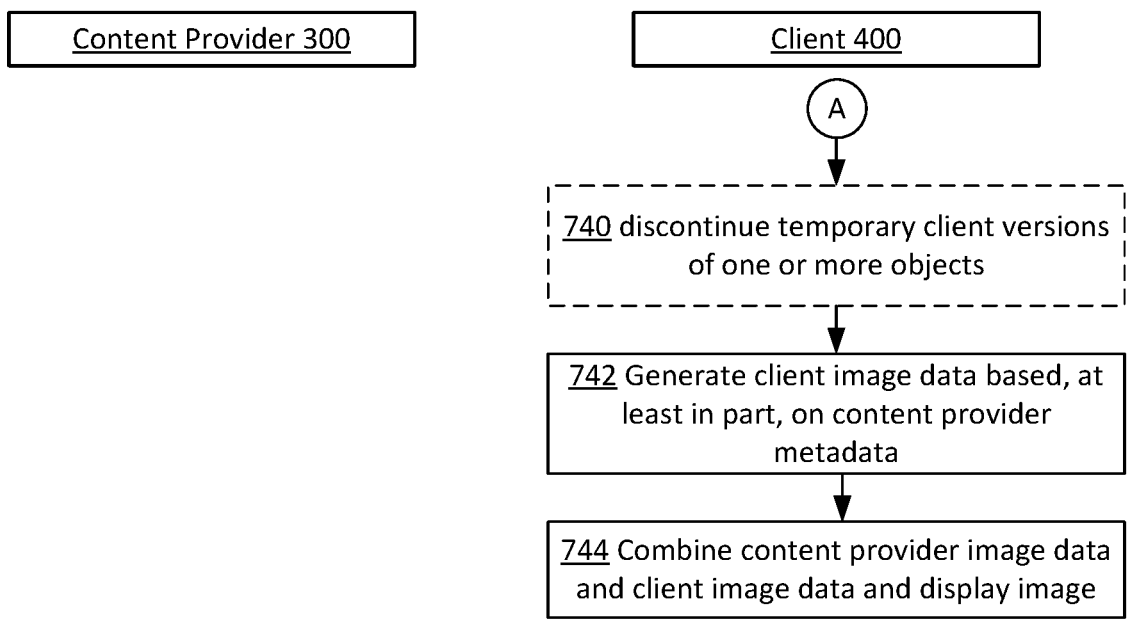

Some example processes for coordination of content presentation operations will now be described in detail with reference to FIGS. 7A-7B. In particular, as noted at the tops of FIGS. 7A and 7B, operations depicted on the left side of FIG. 7A or 7B are performed by the content provider 300 of FIG. 3, while operations depicted on the right side of FIG. 7A or 7B are performed by the client 400 of FIG. 3. Referring now to FIG. 7A, at operation 710, the content provider generates content provider image data. For example, the content provider may manipulate various geometries and perform various texturing, shading, and/or lighting operations in association with a scene of a content item, such as a video game. As set forth above, the content provider may employ one or more graphics processing units (GPU's) and other processing components for generating of content provider image data. The content provider image data generated at operation 710 may be associated with a particular frame of a content item.

At operation 712, the content provider generates content provider metadata associated with the content provider image data generated at operation 710. As set forth above, the content provider metadata generated at operation 710 may include, for example, location information associated with a corresponding frame. For example, the metadata may indicate a location, angle, field of view, and/or zoom of a virtual camera associated with a frame or other image data, locations of various objects and geometries within a frame or other image data, and depth mask or other depth data for a frame or other image data. As a specific example, a portion of the content provider metadata generated at operation 712 may identify a location, within a frame, of an enemy combatant towards whom a user may wish to fire a ballista and launch a projectile. The content provider metadata may also include, for example, orientation, rotation, angle, size, state, scale, animation, effect, transition, motion, speed, or additional data reference information associated with a respective frame or other image data portion. In some cases, the metadata may refer to other data coming from other sources, such as an additional stream or a less-space-restricted channel.

At operation 714, the content provider transmits the content provider image data generated at operation 710 and the content provider metadata generated at operation 712 to the client. As set forth above, in some cases, the image data may be transmitted to the client as a portion of image data within an image data series, while the metadata may be transmitted to the client as a portion of metadata within a metadata series. In some cases, the image data series and metadata series may be transmitted to the client as part of a single data transmission stream. For example, in some cases, each metadata portion may be embedded within a respective image data portion.

At operation 716, the client receives the content provider image data and content provider metadata transmitted at operation 714. At operation 718, the client generates local client image data based, at least in part, on the content provider metadata received at operation 716. As set forth above, the client may employ one or more graphics processing units (GPU's) and other processing components for generating of client image data. As set forth above, the client may use the content provider metadata, for example, to determine locations (e.g., coordinate values) within a frame at which to generate and insert local client image data and/or locations within a frame at which to cull rendering of local client image data. As a specific example, if the content provider metadata identifies a location, within a frame, of an enemy combatant, then the client may use this location to render and display an aiming target that identifies the location. For example, the client may render an aiming line (e.g., a line of fire) from a ballista launch point or other reference point to the identified location of the enemy combatant. As another example, the client may render an X symbol, a blinking light, or other form of aiming target at, or near, the identified location of the enemy combatant.

At operation 720, the client combines the content provider image data received at operation 716 and the client image data generated at operation 718 and displays a resulting image to the user. At operation 722, the client receives client event data associated with the displayed image. As set forth above, the received client event data may be associated with an event within the context of the content item. As also set forth above, the client event data may include, for example, data associated with user input, state changes, or other events associated with the content item that are generated on client side, including with or without collaboration from the content provider. For example, the client event data may be associated with user input that causes the ballista to fire and launch a projectile into space.

At operation 724, the client generates metadata associated with the client event data. For example, the client metadata may include an indication of at least one of a time, a frame, a location, an angle, a direction, a force, a speed, or other information associated with the client event data. In some cases, the time associated with the client event data may be indicated as a frame number associated with the client event data. Also, in some cases the frame number associated with the client event data may be indicated in the client metadata separately from the time. As set forth above, client metadata associated with a launching and firing of a ballista may include, for example, an indication of any one or more of the release of the ballista, a time and/or frame at which the ballista is released, a time and/or frame at which the ballista will fire, a location (e.g., coordinates) of the release, an angle of the release, a force of the release, a direction of the release, a speed of the release, and others.

At operation 726, the client transmits an indication of the client event data and the client metadata to the content provider. At operation 728, the content provider receives the indication of the client event data and the client metadata. At operation 730, the content provider generates content provider image data based, at least in part, on the indication of the client event data and the client metadata. In some cases, the content provider may use indication of the client event data and the client metadata to determine a location, within a frame, at which to render one or more objects. As a specific example, the content provider may use information such as the time, location, angle, and force of the ballista release to determine a location of the ballista projectile within subsequently rendered fames. In the particular examples of FIGS. 4 and 5, the ballista projectile is launched in frame 2, and the content provider receives client metadata associated with the launch of the ballista projectile just prior to rendering frame 5. Accordingly, in frame 5, the content provider renders the projectile as if it had launched in frame 2 and flown for three frames.

At operation 732, the content provider generates content provider metadata associated with the content provider image data generated at operation 730 and including confirmation of receiving the indication of the client event data at operation 728. At operation 734, the content provider transmits the content provider image data generated at operation 730 and the content provider metadata generated at operation 732 to the client. At operation 738, the client receives the content provider image data and content provider metadata transmitted at operation 734.

At operation 736, the client may optionally generate temporary local client versions of one or more objects for display in one or more intermediate frames until confirmation of receiving the client event data is received from content provider. Operation 736 is an optional operation, as indicated by the dashed line in FIG. 7A. For example, as set forth above with respect to FIG. 6, the client may, in some cases, optionally render temporary local client versions of the projectile for display in frames 2-4, as indicated by additional comments box 600 of FIG. 6. In some cases, less processing may be required to generate a client version of an object than is required to generate a corresponding content provider version of the object. For example, the client version of the object may be a lower complexity version of the object, while the content provider version of the object may be a higher complexity version of the object.

At operation 740, after receiving the content provider metadata including the confirmation of receiving the indication of client event data, the client may discontinue the temporary client versions of the one or more objects (in cases when such temporary client versions were generated at operation 736). For example, in some cases, the temporary client versions may appear to be merged into the content provider versions of the objects that may, for example, be identified in the content provider metadata received at operation 738. In some cases, the temporary client objects may be discontinued at an image that is generated based, at least in part, on the image data received along with the confirmation from the content provider (i.e., the image data received at operation 734). By contrast, in some cases, the client versions of the one or more objects may be at least partially continued even after receipt of the confirmation from the content provider. At operation 742, the client may generate local client image data based, at least in part, on the content provider metadata received at operation 738, and, at operation 744, the client combines the content provider image data received at operation 738 and the client image data rendered at operation 742 and displays a resulting image to the user.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   one or more processors
   one or more memories to store a set of instructions, which if executed by the one or more processors, causes the one or more processors to perform operations comprising:
   rendering a first object in a video game to be displayed on a client device;
   sending the first object to the client device along with metadata; and
   causing a second object in the video game to be rendered by the client device based, at least in part, on the metadata, wherein the first object and the second object are rendered in an image based on the second object being positioned at a deeper depth than the first object, wherein the metadata identifies a location of the first object within the image, and wherein the deeper depth of the second object is represented by culling rendering of the second object at the location of the first object.

2. The system of claim 1, wherein the operations further comprise transmitting an image data series comprising a plurality of image data portions, wherein the first object is included in at least one of the plurality of image data portions.

3. The system of claim 1, wherein the operations further comprise transmitting a metadata series comprising a plurality of metadata portions, the metadata is included in at least one of the plurality of metadata portions.

4. The system of claim 3, wherein the plurality of metadata portions comprise at least one of location, orientation, rotation, angle, size, state, scale, animation, effect, transition, motion, speed, or additional data reference information associated with respective image data portions.

5. The system of claim 3, wherein one or more of the plurality of metadata portions comprise information associated with at least one of a virtual camera corresponding to a respective image data portion or one or more objects represented by image data in a respective image data portion.

6. A method comprising:
   rendering, by one or more server computing devices, a first object in a video game to be displayed on a client device;
   sending, by the one or more server computing devices, the first object to the client device along with metadata; and
   causing, by the one or more server computing devices, a second object in the video game to be rendered by the client device based, at least in part, on the metadata, wherein the first object and the second object are rendered in an image based on the second object being positioned at a deeper depth than the first object, wherein the metadata identifies a location of the first object within the image, and wherein the deeper depth of the second object is represented by culling rendering of the second object at the location of the first object.

7. The method of claim 6, further comprising transmitting an image data series comprising a plurality of image data portions, wherein the first object is included in at least one of the plurality of image data portions.

8. The method of claim 6, further comprising transmitting a metadata series comprising a plurality of metadata portions, the metadata is included in at least one of the plurality of metadata portions.

9. The method of claim 8, wherein the plurality of metadata portions comprise at least one of location, orientation, rotation, angle, size, state, scale, animation, effect, transition, motion, speed, or additional data reference information associated with respective image data portions.

10. The method of claim 8, wherein one or more of the plurality of metadata portions comprise information associated with at least one of a virtual camera corresponding to a respective image data portion or one or more objects represented by image data in a respective image data portion.

11. One or more non-transitory computer-readable storage media having stored thereon instructions that, upon execution by one or more first compute nodes, cause the one or more first compute nodes to perform operations comprising:
rendering a first object in a video game to be displayed on a client device;
sending the first object to the client device along with metadata; and
causing a second object in the video game to be rendered by the client device based, at least in part, on the metadata, wherein the first object and the second object are rendered in an image based on the second object being positioned at a deeper depth than the first object, wherein the metadata identifies a location of the first object within the image, and wherein the deeper depth of the second object is represented by culling rendering of the second object at the location of the first object.

12. The one or more non-transitory computer-readable storage media of claim 11, wherein the operations further comprise transmitting an image data series comprising a plurality of image data portions, wherein the first object is included in at least one of the plurality of image data portions.

13. The one or more non-transitory computer-readable storage media of claim 11, wherein the operations further comprise transmitting a metadata series comprising a plurality of metadata portions, the metadata is included in at least one of the plurality of metadata portions.

14. The one or more non-transitory computer-readable storage media of claim 13, wherein the plurality of metadata portions comprise at least one of location, orientation, rotation, angle, size, state, scale, animation, effect, transition, motion, speed, or additional data reference information associated with respective image data portions.

15. The one or more non-transitory computer-readable storage media of claim 13, wherein one or more of the plurality of metadata portions comprise information associated with at least one of a virtual camera corresponding to a respective image data portion or one or more objects represented by image data in a respective image data portion.

\* \* \* \* \*